United States Patent [19]

Figuereo

[11] Patent Number: 5,238,376
[45] Date of Patent: Aug. 24, 1993

[54] SHAPING DEVICE FOR A SOFT EXTRUDED PRODUCT

[75] Inventor: Blaise F. Figuereo, Triel-sur-Seine, France

[73] Assignee: Eropol Finance et Developpement, Vernouillet, France

[21] Appl. No.: 826,891

[22] Filed: Jan. 28, 1992

[30] Foreign Application Priority Data

Jan. 28, 1991 [FR] France .................. 91 00909

[51] Int. Cl.$^5$ .............................. B29C 47/94
[52] U.S. Cl. .................................. 425/97; 425/107; 425/186; 425/188; 425/192 R; 425/384; 425/461; 264/211.13
[58] Field of Search ............ 425/85, 84, 186, 188, 425/192 R, 380, 384, 378.1, 461, 133.5, 190, 107, 71, 72.1, 97; 264/211.13, 211.12, 211.2, 236, 237

[56] References Cited

U.S. PATENT DOCUMENTS

| 4,179,256 | 12/1979 | Tomioka et al. | 425/384 |
| 4,247,271 | 1/1981 | Yonekura et al. | 264/236 |
| 4,353,861 | 10/1982 | Caser | 264/236 |
| 4,356,143 | 10/1982 | Hill et al. | 425/71 |
| 4,564,486 | 1/1986 | Wherry | 264/236 |

Primary Examiner—Khanh P. Nguyen
Attorney, Agent, or Firm—Rodgers & Rodgers

[57] ABSTRACT

This shaping device, designed to subject the linearly extruded product to a continuous cooling operation or hot vulcanization operation during shaping is in the form of a tunnel (1) the outer casing of which has incorporated internal channels (A) which do not open out into the inside of this outer casing and which circulate a liquid or fluid at a temperature determined on the basis of the cooling or vulcanization operation chosen, this tunnel having on the inside, mounted in a vertical position, several matrices (FIG. 6) fitted against one another, each matrix, in the form of a monoblock laminated plate, having a central calibrated passage for shaping of the product extruded and under extrusion, and also a first radial network (9) for introduction of a gaseous fluid, at a temperature determined on the basis of the operation chosen, coming from the channels (B) inside the outer casing, for distribution of the gaseous fluid under pressure, in the direction of the central passage and over the outside of the extruded product being fed through this passage, and also a second radial network (8) for suction of the used gaseous fluid from the central passage in the direction of the suction channels (C) inside the outer casing.

8 Claims, 4 Drawing Sheets

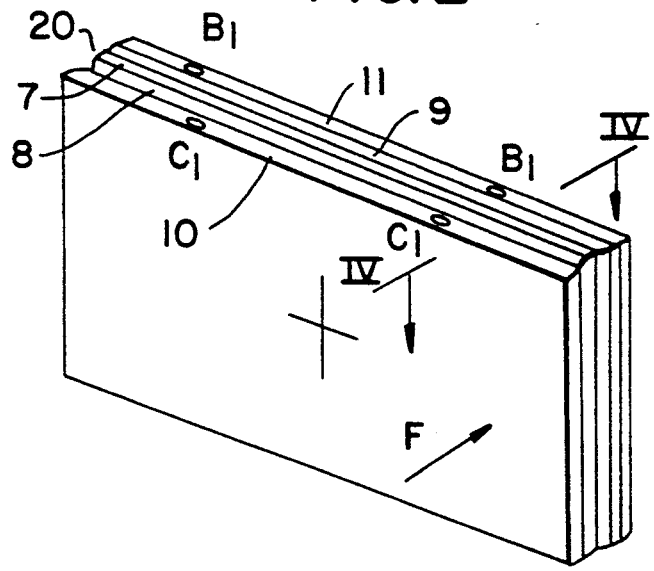
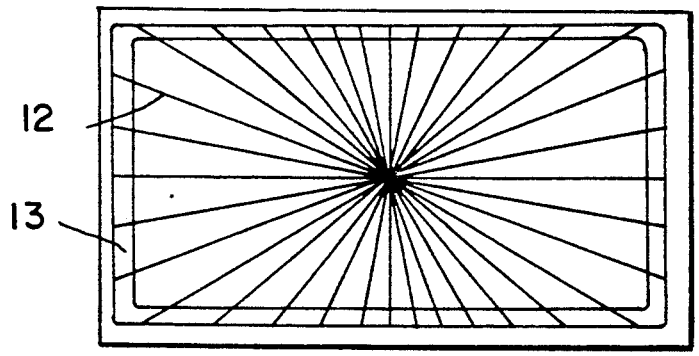
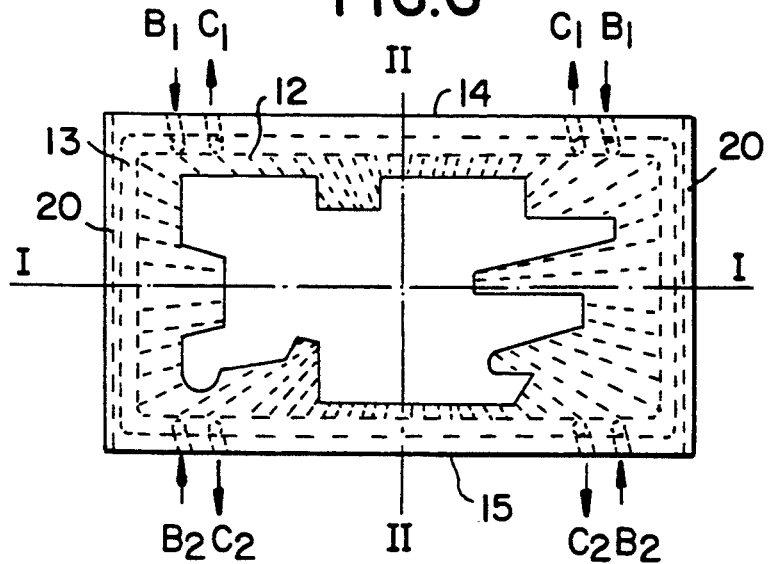

SHAPING DEVICE FOR A SOFT EXTRUDED PRODUCT

BACKGROUND OF THE INVENTION

The present invention relates to a shaping device for a soft extruded product. More especially, it concerns a device fitted to the extruder outlet to enable the linear flow of an extruded product in a soft state and to subject this product during its shaping in the required calibrated cross-section orifice to a cooling operation, or a hot vulcanizing operation, as well as an external surface smoothing in order to diminish as much as possible the surface friction to the product inside the orifice calibrated to the cross-section required and, moreover, to avoid any risk of the product sticking during its soft state to the inside wall of the calibrated orifice.

In the technique currently used to produce extrusions such as, for example, sections made from plastomer type plastic materials, it is necessary, immediately after the extrusion operation, to fix the cross-section of the section during the setting process in order to obtain the calibrated cross-section required. To do so, shaping devices are currently used, comprised of a single piece, designed to consume the necessary heat to obtain a viscous raw material and which enable vacuum to be used to apply the outside surface of the extruded section to the inner wall of the internal orifice in the shaping block which is calibrated to the cross-section required for the plastic section. This section cooling and shaping operation is performed during the continuous extrusion operation and certain problems of the section "sticking" to the calibrated orifice, during its soft state, frequently occur and constitute the main drawback with this type of shaping of the extruded product in the cooling phase.

The purpose of this invention is to provide a shaping device for linearly extruded products which eliminates the greater part of the drawbacks mentioned on single-piece devices such as are known to date and whose internal orifice for shaping of the product to the calibrated cross-section required may be adapted as required to the desired length by the addition of individual matrices positioned one after the other and each designed to enable the introduction of a gaseous fluid, at a temperature determined on the basis of the cooling or vulcanization operation chosen, in the direction of and on the outside of the extruded product to be shaped, and also a suction, in the direction of the matrix perimeter, of a gaseous fluid which has flowed round the product, the fluid circulation producing in each device, between the external surface of the product and the inner wall of the shaping orifice, a fluid layer flowing along the product in the extrusion direction and, consequently, preventing the product from sticking to and reducing its friction on the inner wall of the orifice whilst contributing to its smoothness and facilitating its flow to the exterior of the device outlet.

SUMMARY OF THE INVENTION

Thus, under the terms of this invention, this shaping device located on an extruder outlet and designed to apply to the linearly extruded product a continuous cooling operation or a hot vulcanization operation during its shaping is remarkable by the fact that it is composed of a tunnel shape whose outer casing incorporates internal channels which do not open out into the inside of this outer casing and in which flow a liquid or fluid at a temperature determined on the basis of the cooling or vulcanization operation chosen, this tunnel having on the inside, fitted vertically, several matrices mounted one after the other, each matrix, in the form of a laminated monoblock plate, having a calibrated central transverse orifice for shaping of the extruded product and under extrusion, and also a first radial network for introduction of the gaseous flux, at a temperature determined on the basis of the operation chosen, coming from the outer casing internal channels distributing the pressurized gaseous fluid, in the direction of the central passage and on the outside of the extruded product being fed through this passage, and also a second radial network for suction of the gaseous flow used from the central passage in the direction of the internal suction channels casing in which there is no link between these liquid or fluid suction channels, distribution channels and circulating channels.

More specifically and in accordance with the invention, each matrix, in the form of a monoblock laminated plate and before there is any cutting of the central shaping passage, is composed of a solid central plate, with around each of its two sides a plate with a radial network of circulating gaseous fluid in the form of radial slots which begin in the centre of this plate and open out into a peripheral channel set back from the outer edge of this plate and with one of the plates linking with the pressurized gaseous fluid distribution channels and, for the other plate, with the suction channels, each of these two radial network plates having, applied to its outer surface, a plate sealing the radial slots from its radial network and its peripheral channel, each sealing plate having, in its upper and lower edges, several orifices providing a link between the network plate peripheral channel, to which is it applied, and the nozzles linking with the corresponding channels inside the outer casing.

Moreover, in accordance with the invention, the radial slots of the two air circulation radial network plates are located at identical and constant angular steps, but however with half a step offset between one plate and the other, so that the gaseous fluid entering the slots in the distribution plate circulates at an angle in the direction of the suction slots in the other plate and so that it forms a layer of gaseous fluid between the centre plate and the outer surface of the extruded product, the angular circulation being executed in the same direction as the flow of the product.

It should be noted that, in one type of design, the central plate of each matrix, forming a sealing plate between the two radial network plates, is preferably in mild steel, the two radial network plates are made in bronze, brass or a hard plastic material such as, for example, Delrin (R), and the two outer sealing plates are in aluminium, preferably of the AU4G type. In addition, each matrix, in the form of a laminated plate, is, after the calibrated shaping passage is made in its centre part, cut at least by half into two parts and, as necessary, into four quadrangular parts in accordance with the configuration of the cross-section of the extruded product in order to enable the introduction of each part around this product under soft extrusion and to constitute a monoblock matrix maintaining this product during its feed.

In addition, in accordance with this invention, this extruded product shaping device is provided with a device for fitting and positioning, for each of the laminated plates constituting each matrix, inside the outer casing, this device being composed of a moving support cradle the shape of which corresponds to the external shape of each matrix and which is designed to enable the fitting of the cut-out parts of each matrix around the extruded product in the soft state, its movement in the assembled position in the direction of the entrance to the tunnel located opposite the extrusion nozzle output die and its partial introduction in a vertical plane in this entrance, the cradle being designed to release this partly introduced matrix when it is actuated to return to the initial position with a view to the fitting into it of the following matrix, which will push the preceding matrix into the tunnel when it is in turn partly introduced into the tunnel entrance.

It should be noted that, in accordance with the invention, the moving support for the fitting and partial introduction of each matrix into the tunnel is fitted on the sides with retractable pins or magnets designed to act on the central steel plate by means of grooves running vertically in the corresponding lateral edges of each matrix, these grooves also being designed to enable the insertion of flat pins for the positioning and locking of each matrix inside the tunnel.

Moreover, in accordance with the invention and in one type of design, to facilitate the installation of successive matrices, the upper part, or the roof, of the tunnel outer casing is designed in the shape of a cover, which moves on hinges, and which has a layer of circulating channels for a fluid or liquid at the determined temperature, and also insertion channels for feeding the gaseous fluid at the determined temperature into each of these matrices, and channels for suction of the used gaseous fluid from each of these matrices. In addition, to maintain each matrix firmly assembled around the extruded product during its transportation to the tunnel entrance by the moving support cradle, the latter is fitted with a top cover hinged on one side and locked as required on the other opposite side.

It should be noted that before beginning introduction of the matrices into the tunnel, the latter is filled with frames located in place of the future matrices and designed to blank the gaseous flow inlet and suction nozzles, these nozzles linking with each matrix inserted into the tunnel and pushing out the above-mentioned frames which are removed from the tunnel one by one as the tunnel is gradually filled with the determined number of matrices.

In addition, to facilitate the installation on the extruder nozzle, this shaping device, with its moving cradle, is mounted on a moving support table and is height and position adjustable along the extrusion head axis, the moving cradle being designed to retract when the tunnel is fitted with the determined number of matrices to obtain the shape required and to come up to this tunnel to touch the outlet side of the extrusion head die. Where only one tunnel is insufficient to obtain correct shaping of the extruded product, it is possible to install a second one as an extension to it.

It should also be noted that, as the tunnel is being filled with the matrices resulting in the simultaneous expulsion of the frames which blank the gaseous fluid inlet and suction orifices, the cover internal channels are not supplied for as long as the cover is in the open position.

Furthermore, by way of information and without deviating from the scope of this invention, it can be pointed out that the matrices may be of a rectangular or square cross-section, the tunnel casing having the corresponding internal shape. In addition, these matrices may have two laterally twinned radial networks and be designed for operation with two twinned extrusion heads, these matrices being kept and positioned in a single tunnel envelope to house the various internal channels.

Moreover, one may use, without deviating from the scope of this invention, matrices of a circular cross-section cut into two halves or into four quadrangular parts, the tunnel outer casing being, in this case, composed of a cylindrical sleeve formed of two semi-cylindrical parts one of which will be the lower half, with a baseplate, and the other the hinged cover upper half, the moving cradle having a semi-cylindrically shaped support and of identical shape with the cover.

BRIEF DESCRIPTION OF THE DRAWINGS

Other characteristics of this invention shall appear from the following description of a type of design of extruded product shaping device, given by way of non-limitative example, and represented schematically in the enclosed drawings, in which:

FIG. 2 is a perspective schematic view of a matrix in which the central shaping passage is not yet cut out;

FIG. 5 is a front view along arrow F in FIG. 2, showing one of the radial networks in the matrix shown in this figure with the outer sealing plate removed;

FIG. 6 is a front view of the matrix in FIG. 2 in which its shaping extruded production cross-section passage is cut after which it has been cut into four parts along axes I—I, II—II;

DESCRIPTION OF THE PREFERRED EMBODIMENT

Figure 1:
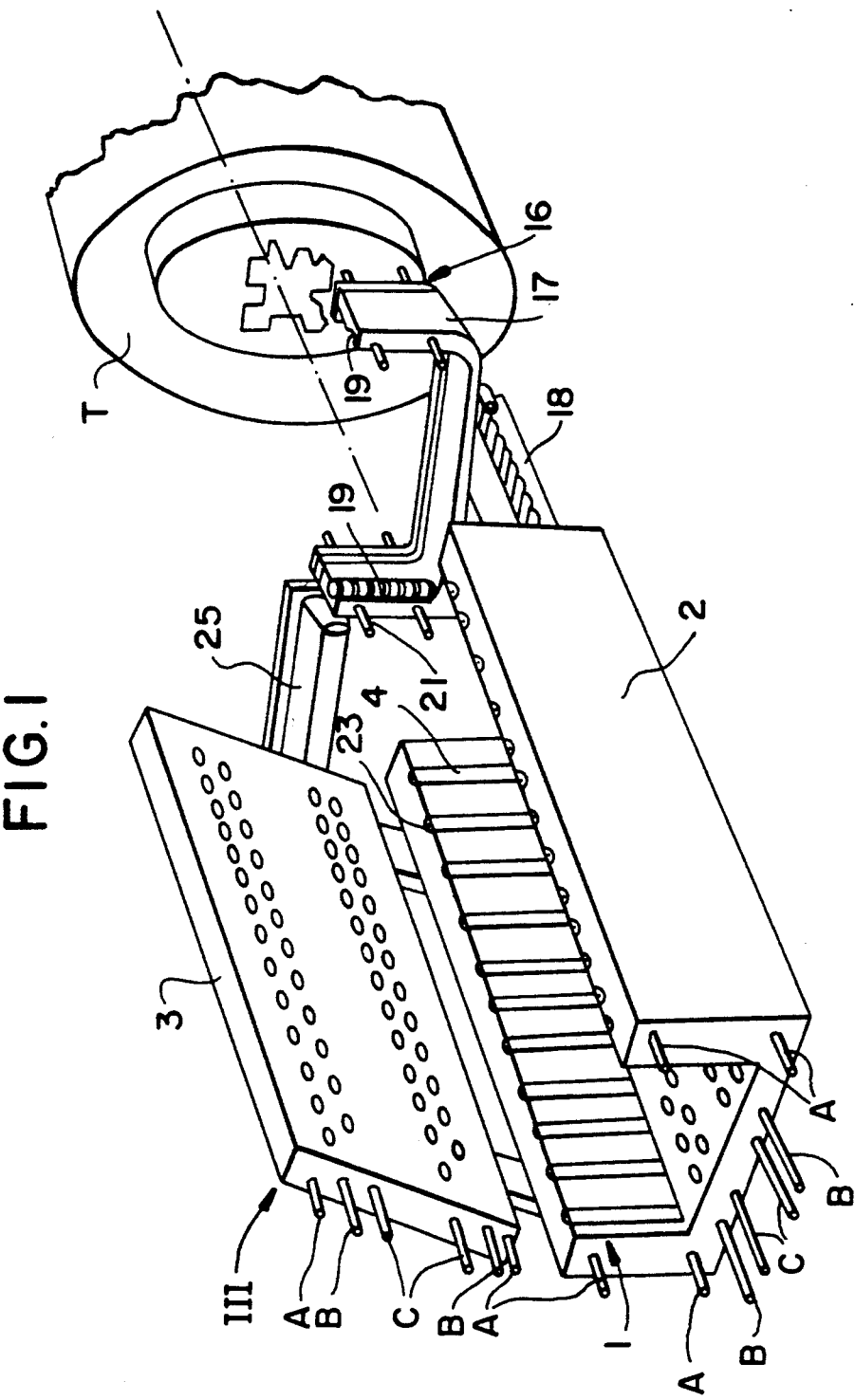
FIG. 1 is a perspective schematic view of the tunnel, empty, of the device as per the invention.

As can be seen from these figures, and particularly FIGS. 1, 2, 3 and 6, the shaping device as per this invention, and in accordance with a type of design, is composed of a tunnel (1) whose outer casing has a U-shaped base part (2), and a cover (3) hinged part, and is designed to take on the inside, against one another in the vertical position, several matrices of the type shown in FIG. 2 but, of course, executed with a central shaping passage as shown, by way of example, in FIG. 6 whose cross-section is calibrated to that of an extruded product being continuously fed out of the die located on the extrusion head outlet nozzle (T) and which is to be shaped during cooling. It should be noted no matrix is shown in FIG. 1 inside the tunnel outer casing in order to facilitate comprehension, the position of the matrices corresponding to the vertical grooves 4 designed to receive a matrix locking pivoting pin as described below in relation to FIG. 7.

Figure 3:
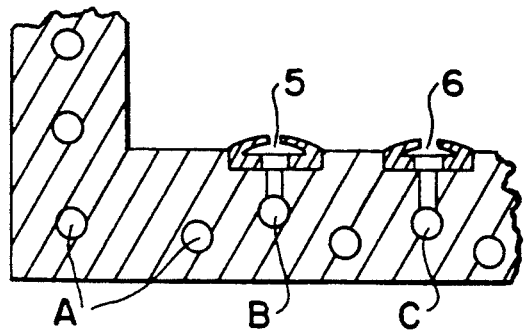
FIG. 3 is a part cross-sectional view of corner III of the tunnel as shown in FIG. 1.

As can be seen best in FIGS. 1 and 3, the base part (2), including its side walls and part of the cover (3) are brought to the required temperature by a fluid or liquid at a determined temperature circulating in the channels (A) built into these parts (2, 3), and also the channels (B) in which a pressurized gaseous fluid circulates and the channels (C) for suction of this gaseous fluid when it has been used.

It should be noted that there is no link between these three types of channel and that only channels (B) and (C) open out into the inside of the tunnel by means of their respective nozzles, referenced (5) for channels (B) and (6) for channels (C), each fitted with a seal (FIG. 3) for feeding a gaseous fluid to each respective matrix fixed in the tunnel and to extract by suction the used gaseous fluid from each matrix which we shall describe below with reference to FIGS. 2, 4, 5 and 6.

In fact, each matrix is in the form of a monoblock laminated plate (FIG. 2) which is composed of, located against one another and fixed together by welding, bonding or mechanically, a central plate (7), surrounded on each of its two sides by a plate (8, 9) containing an air circulation radial network, and each having, applied to its outer surface, an external plate (10, 11) sealing the corresponding radial network, the central plate (7) also acting as the internal sealing plate for the two radial networks so that the latter only link with one another when in line with the wall provided by this central plate in the shaping passage of the extruded product. Each of these radial networks, as shown in FIG. 5, is composed of radial slots (12) beginning in the center of each plate (8, 9) which open out into a peripheral channel (13) set back from the outer edge of each plate.

Figure 4:
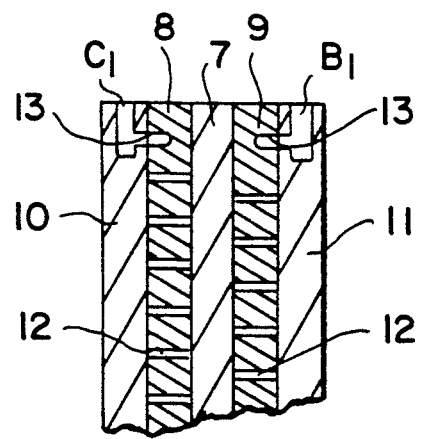
FIG. 4 is a vertical part cross-sectional view taken along line IV—IV in FIG. 2.

These radial slots are made at an identical and constant angular pitch in each of the plates (8, 9), but however with an offset of a half-pitch from one plate to the other, as can be better seen in the cross-sectional view in FIG. 4. It can also be seen from this figure that the peripheral channel (13) in each plate (8, 9) links with each nozzle (5, 6) respectively, corresponding to the channels (B, C) by means of the respective orifices (B1, B2 and C1, C2) in the upper (14) and lower (15) edges respectively in the outer sealing plates (10, 11) as can be best seen from FIGS. 4 and 6.

From the above it can be understood that, for each of the matrices in the tunnel, the channels (B) feed the gaseous fluid under pressure to the radial slots in each plate (9) and that this fluid, after being used to circulate over the outer surface of the product extruded in the shaping passage, is sucked into the radial slots in each plate (8) by the suction channels (C). Moreover, as these matrices are located in the tunnel so that the outer side of each sealing plate (11) of the plate (9) is facing the tunnel entrance end, or the extrusion head end, each sealing plate (10) of the plate (8) being, as a result, located on the tunnel outlet end, the circulation of the gaseous fluid in the shaping passage of each matrix being made in the same direction as that of the extruded product feed imparting to the extruded product a sort of feed assistance towards the tunnel outlet due to the formation of a surface layer of gaseous fluid on the outside of the product in the passage which reduces the friction in the latter and causes a sort of external smoothing of the product, especially as the radial slots are offset from one plate (9) to the other (8) giving an angular circulation of the cold gaseous flow advantageous as a result over the whole of the external surface of the product between two suction slots.

It should be noted, for information, that the gaseous flow radial distribution slots, that is to say, in the plate (9) are, preferably, 300 microns wide, whereas those for suction in the plate (8) are, preferably, of a width varying from 50 to 300 microns wide. Moreover, in this type of design the matrix and for information, the central plate (7), is manufactured from mild steel, the radial network plates (8, 9) are in bronze and the external sealing plates (10, 11) are in aluminium.

Figure 7:
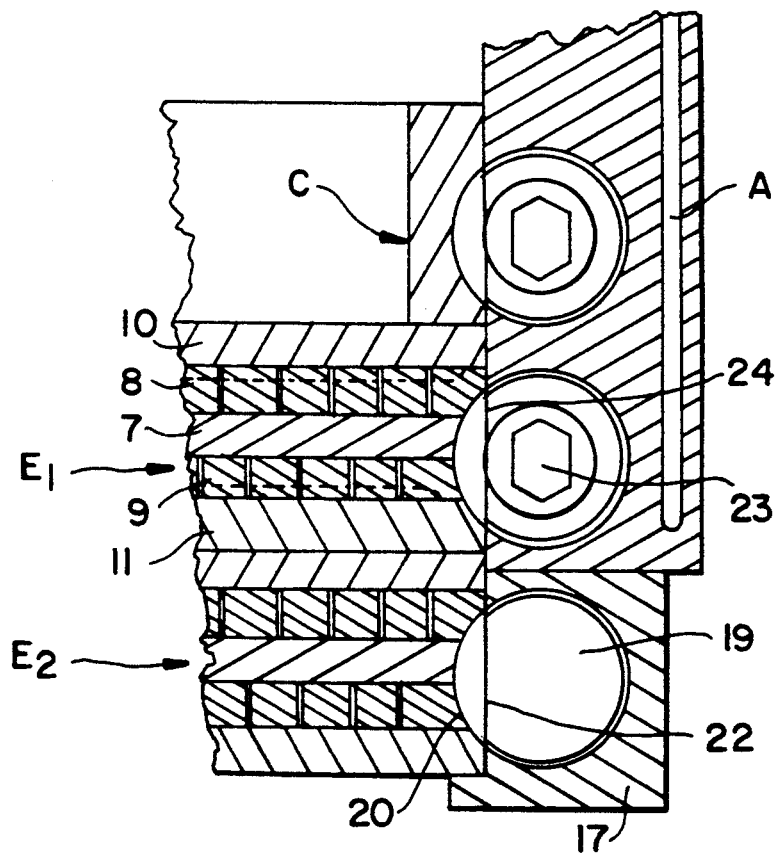
FIG. 7 is a plan and part cross-sectional view of the right corner of the tunnel entrance, viewing the entrance and the matrices are being inserted into the tunnel pushing out the preceding frames blanking the gaseous fluid inlet and suction orifices.

Furthermore, regarding the fitting of these matrices in the tunnel, we shall now refer more especially to FIGS. 1 and 7. In fact, as can be seen from FIG. 1, the shaping tunnel, which can be aligned and level with the extrusion head (T) by means of a movable lift table (not shown) is fitted with a device (16) for loading and positioning the matrices in the tunnel after each of them, designed cut into two or four quadrangular parts (as shown by lines I—I, II—II in FIG. 6) has been fitted as a single piece, around the product exiting in a soft state from the extrusion head (T) die, in the moving support cradle (17) of the device (16), this cradle being able to move in the direction of the head (T) and in the direction of the tunnel entrance by means of rack systems (18). This cradle is designed to take each matrix fitted and hold it in the vertical position offset towards the tunnel entrance by means of the lateral pivoting of flat pins or magnets (19), designed to engage in the lateral grooves (20) in each matrix and designed to enable the insertion of locking pins in the tunnel in line with the internal vertical grooves (4) in the side walls of the tunnel. Note that these pins or magnets (19) are pivoted by the pegs (21) for operation on assembly of a matrix in the support cradle (17) and are out of action when the cradle has pushed this matrix to partly engage in the tunnel entrance, as can be best seen from FIG. 7. In fact, as can be seen from this figure, a first matrix (E1), partly engaged initially, has been pushed in by a second matrix (E2) which is partly engaged by the support cradle (17) the magnet (19) of which is released from the lateral groove (20) of the matrix and has its flat (22) parallel to the lateral edge of the latter. It should also be noted that, as can be seen from FIG. 7, each pin (23) locking the matrix in the tunnel remains in position released from the matrix lateral groove with its flat (24) parallel to the inner wall of the tunnel throughout loading of the required number of matrices in the tunnel to obtain the required shape of the extruded product. Furthermore, as shown in FIG. 1, to facilitate the transfer of a matrix mounted in the moving support cradle (17), the moving support is fitted with a cover (25) hinged on one side and locked as required on the other side of the cradle.

It can be seen from FIG. 7, the first matrix (E1), engaged and pushed in by the partly engaged second matrix (E2), pushes on the frame (c) preceding it and, as a result, all the other frames blanking the inlet and suction orifices for the gaseous fluid used with which the tunnel is filled completely initially before the beginning of the shaping operation, that is to say, the insertion of the matrices in the tunnel.

It should be noted that naturally it is not necessary to fill the tunnel completely with matrices to obtain an appropriate shape, the nozzles (5, 6) of the respective channels (B, C) not used remain blanked by the frames (c) not removed from the tunnel due to being pushed on by the matrices inserted in the tunnel.

Moreover, to enable the tunnel loaded with its matrices to be brought up into contact with the extrusion head (T), the moving support cradle (17), and the transfer racks (18), are designed to retract, preferably downwards. This is in order not to obstruct positioning of the tunnel in the immediate proximity of the extrusion head die outlet so that the product under extrusion does not tend to curve due to its own weight before being supported by the first matrices in the tunnel entrance.

I claim:

1. Apparatus for continuously shaping and hot or cold vulcanizing an extruded material, said apparatus comprising an extruder for extruding a material to form said extruded material; a plurality of matrices, each having a plurality of plates which are vertically positioned and against each other, said plates defining a calibrated passage which has an inlet receiving said extruded material, and an outlet for exiting said extruded material; a tunnel having outer casing walls defining a main chamber which accommodates said matrices; a plurality of liquid internal channels (A) longitudinally embedded in said casing walls for circulating a heating or cooling liquid having a chosen temperature; a plurality of distributing gaseous channels (B) longitudinally disposed in said casing walls for receiving a pressurized gaseous fluid; a plurality of suctioning channels (C) longitudinally disposed in said casing walls for exiting said gaseous fluid wherein said distribution gaseous channels include first nozzles (5) communicating with a first radial channel network which is disposed around the calibrated passage for delivering the gaseous fluid from said distributing gaseous channels to outer surfaces of the extruded material flowing in said calibrated passage; and wherein said suctioning channels include second nozzles (6) communicating with a second radial channel network which is disposed around the calibrated passage for removing the gaseous fluid at said outer surfaces of the extruded material flowing in said calibrated passage out of the calibrated passage via the second radial channel network and the second nozzles.

2. Apparatus according to claim 1 wherein each of said matrices comprises a central plate (7), an intermediate plate disposed on each side of said central plate (8, 9), one of said intermediate plates (9) communicating with said pressurized gaseous fluid distribution channels (B) and the other of said intermediate plates (8) communicating with said suctioning channels (C), and each of said intermediate plates having disposed against its outer face a sealing plate (10, 11).

3. Apparatus according to claim 1 wherein each of said radial channel networks comprises radial slots (12) communicating with a peripheral channel (13).

4. Apparatus according to claim 2 wherein said central plate (7) is made from mild steel, said two intermediate plates (8, 9) are made from bronze, brass or a hard plastic material, and said two outer sealing plates are made from aluminum.

5. Apparatus according to claim 1 wherein each matrix is divided into two or more parts.

6. Apparatus according to claim 1 wherein a loading and positioning device (16) is positioned at the outlet end of said extruder and said device comprises a moving support cradle (17).

7. Apparatus according to claim 1 wherein said tunnel comprises a cover (3), said cover including said channels (A) for circulation of liquid or fluid at a determined temperature, said channels (B) for feeding the gaseous fluid at a determined temperature into each of said matrixes, and said channels (C) for suction of used gaseous fluid from said matrices.

8. Apparatus according to claim 6 wherein said support cradle (17) is provided with a top cover (25) hinged on one side thereof and lockable on the other opposite side.

* * * * *